Nov. 14, 1967  D. J. GASCH ET AL  3,351,977

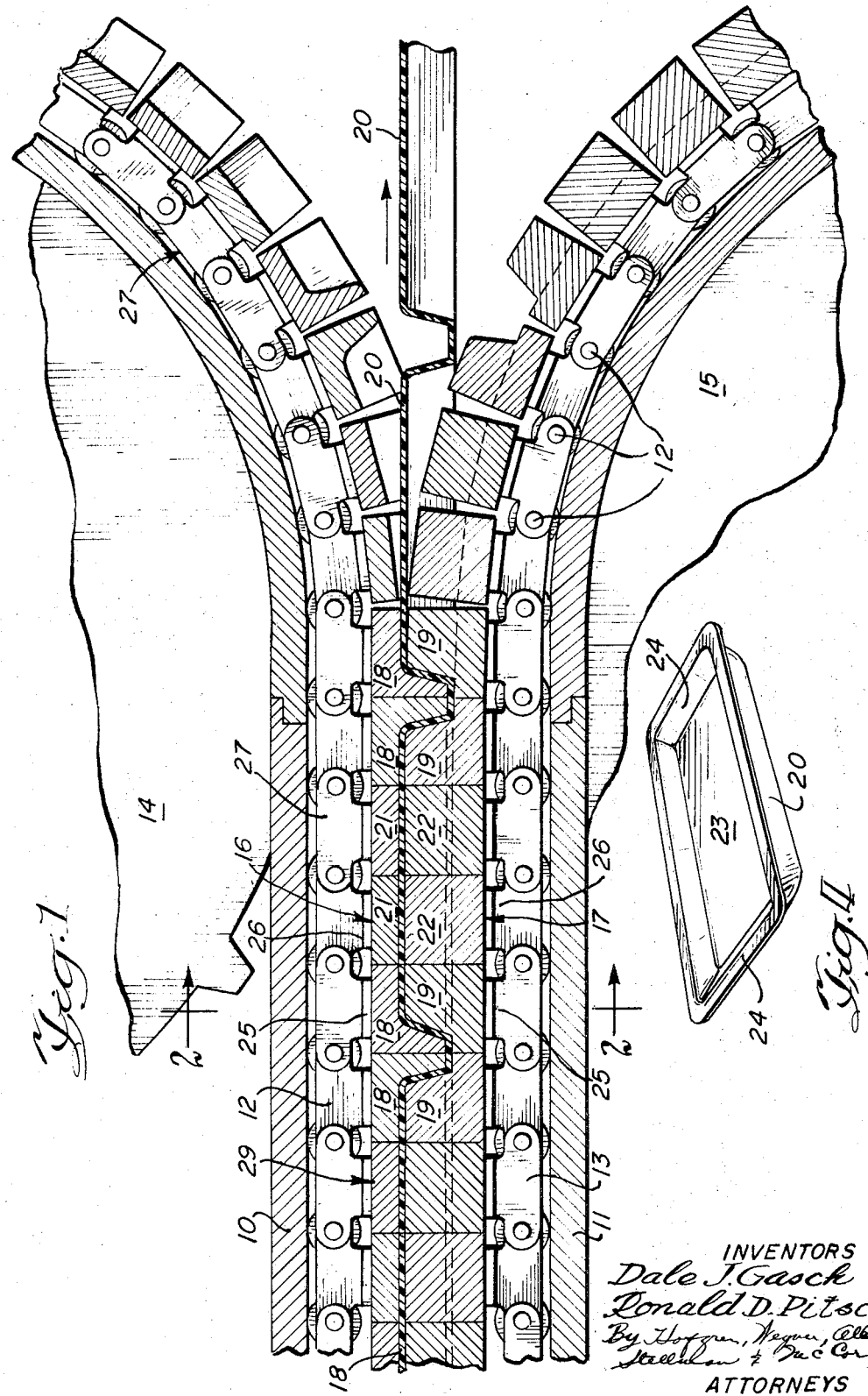

SHAPING APPARATUS

Filed Aug. 3, 1965

3,351,977
SHAPING APPARATUS
Dale J. Gasch, Neenah, and Ronald D. Pitsch, Omro, Wis., assignors to American Excelsior Corporation, a corporation of Delaware
Filed Aug. 3, 1965, Ser. No. 476,831
1 Claim. (Cl. 18—4)

ABSTRACT OF THE DISCLOSURE

Apparatus for molding a series of individual molded articles such as trays, cups and the like utilizing a series of sets of cooperating mold parts with each set cooperating to form one of the articles and with the mold parts of each set being constructed of individual separable segments that are brought together for the molding of the individual article and are then separated in moving the mold parts in a continuous manner away from their molding cooperation.

---

This invention relates to a shaping apparatus for producing articles of a deformable material in a continuous operation.

Many molded and shaped articles are used in vast numbers so that production of successive articles must be rapid, at least semi-automatic and with apparatus occupying small space. Good examples of such mass produced articles are plastic trays such as those used for holding pre-portioned meat, fruit, vegetables and the like in mass sales supermarkets, plastic cups such as are used in beverage dispensing machines and the like, metal articles, and the like.

One of the features of this invention is to provide an improved apparatus for shaping a series of articles rapidly, inexpensively and efficiently with the apparatus occupying small space in relation to the size of the articles themselves and the capacity of the apparatus.

Other features and advantages of the invention will be apparent from the following description of one embodiment thereof taken in conjunction with the accompanying drawings.

FIGURE 1 is a fragmentary vertical sectional view of an apparatus embodying the invention for molding shallow plastic trays.

FIGURE 4 is a perspective view of a typical shallow tray produced by the apparatus of FIGURES 1–3.

Figure 3:
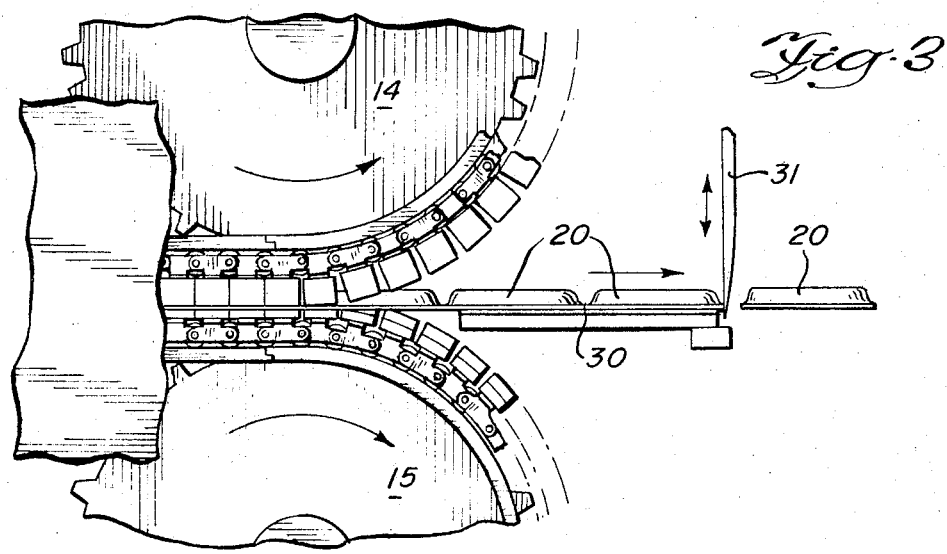
FIGURE 3 is a fragmentary side elevational view of the exit end of the apparatus.
Figure 2:
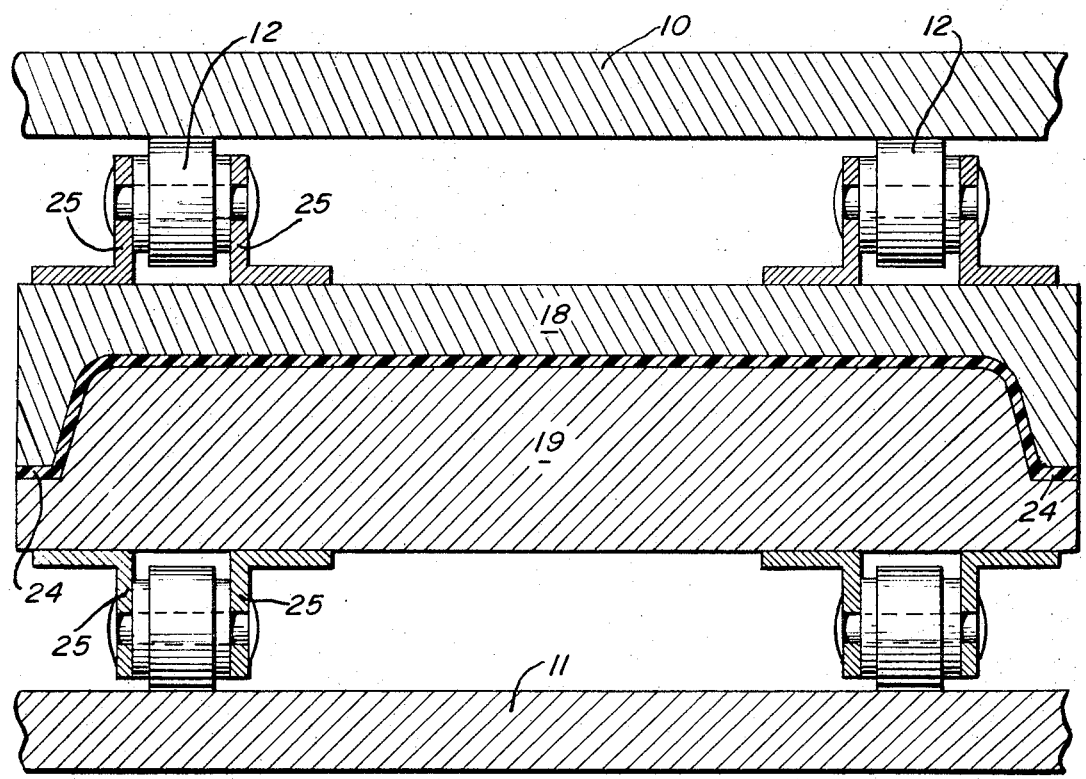
FIGURE 2 is a fragmentary vertical sectional view along the line 2—2 of FIGURE 1.

The apparatus shown in the accompanying drawings comprises upper and lower guides 10 and 11 arranged in generally oval shape to guide the movement of upper 12 and lower 13 chains each driven in an endless oval path by drive sprockets 14 and 15, respectively. As can be seen, the chains 12 and 13 and their drive sprockets 14 and 15 are purely conventional and the same is true for the guide sprockets (not shown) that are similar to the drive sprockets 14 and 15 but are located at the opposite ends of the ovals traversed by the chains 12 and 13.

Each chain 12 and 13 carries a cooperating mold part 16 and 17. These mold parts are arranged in molding positions in one path portion which are the horizontal portions of the endless paths shown in FIGURES 1 and 3. In this one path portion the mold parts 16 and 17 are in molding positions with a sheet 18 of moldable plastic material therebetween.

In order to expedite the molding, each mold part 16 and 17 is made up of a plurality of individual segments including a pair of end segments 18 and a pair of cooperating opposite end segments 19 for molding the edges of the tray shown at 20 in FIGURE 4. Each mold part 16 and 17 also includes intermediate cooperating segments 21 and 22 for molding the base 23 and ends 24 of each tray. Each of the mold segments 18–22 is mounted on its respective chain 12 or 13 by a bracket 25 or 26 each carried by a chain link 27.

As can be seen from the drawings, when the plurality of separable mold segments are arranged in adjacent series, as shown in the horizontal portion of FIGURE 1, these segments cooperate to produce, in effect, a continuous mold. However, these segments are separable from each other, as shown at the right-hand portions of FIGURES 1 and 3, in a curved path portion 28 of the path of travel of the series of mold parts. As shown in the illustrated embodiment, these curved path portions are curved away from the one path portion 29 in which the mold parts are in molding relationship. The illustrated plastic sheet material 18 may be any of the usual types of moldable material. Thus, it may be expanded polystyrene which is passed through the apparatus of this invention while in heated moldable condition. A typical apparatus for producing such a sheet which is then immediately passed through the apparatus of this invention is disclosed in Gasch et al. application Ser. No. 424,899, filed Jan. 12, 1965, assigned to the same assignee as the present application.

As stated above, the plastic moldable sheet enters the apparatus of this invention as an ordinary sheet. It then leaves the apparatus, as shown in FIGURE 3, shaped to provide a series of the trays 20 interconnected at the edges by webs 30. These trays are separated from each other as by a vertically reciprocable knife shown diagrammatically at 31.

As can be seen from the above description, the apparatus of this invention permits the production of a large number of shaped articles in unit time from a single piece of apparatus. Thus, in molding meat trays a relatively small apparatus was capable of molding commercially over 300 trays per minute.

Because the parts acting to shape the deformable material (the plastic sheet) are made in separable segments that are aligned during the shaping or forming operation but are separated in returning the molds to their starting positions where the sheet material first enters the apparatus, the apparatus can employ very small end sprockets, as shown at 14 and 15, which materially reduces the size of the apparatus. This is particularly true where the articles being formed are of extremely large size. It is obvious how this improved operation is achieved when it is noted that by providing each mold part in cooperating but separable segments each pair of oppositely located segments in the mold parts perform a separate molding function and, in effect, function as separate shaping elements. There is thus no limit to the size of the articles that can be produced precisely even to small tolerances because the successive portions of each article are shaped in series by the series of cooperating shaping elements.

Another very important advantage of the separable segments of this invention is that very close control can be achieved of quite intricate shapes because once the segments, such as those illustrated at 18–22, have completed their shaping operation they are then separated in returning the parts to their initial positions for another series of operations.

By having the parts 16 and 17 assembled in series on endless guides such as the chains 12 and 13, the shaping is continuous and very rapid with very close control of tolerances.

As can be seen from the above description, the invention may be used not only for molding moldable material such as the plastic moldable sheet of the specific embodiment but may also be used for shaping and forming generally. Thus, it can be used for forming metal articles such as steel or aluminum trays or the like, as well as molding a plastic readily flowable material to produce molded articles.

Having described our invention as related to the embodiment shown in the accompanying drawings, it is our intention that the invention be not limited by any of the details of description, unless otherwise specified, but rather be construed broadly within its spirit and scope as set out in the accompanying claim.

We claim:

Apparatus for molding a series of individual concavo-convex molded articles from a strip of moldable material, comprising: a plurality of successive sets of cooperating segmented mold parts, each set internesting successively to mold the individual articles in said series of concavo-convex articles from said strip therebetween; means for arranging the corresponding individual mold parts of said sets for movement in separate paths, said means for arranging including means for bringing said mold parts successively into said internesting cooperation to mold said series of concavo-convex articles therebetween and for separating movement of said parts away from each other after said molding, each said mold part comprising a plurality of separable segments; means for separately mounting said segments for movement to positions adjacent each other during said molding with successive segments of each mold part in contact with each other so as to substantially preclude open spaces therebetween and for separation during said movement of the mold parts away from each other; and means for maintaining said segmented adjacent mold parts in spaced but said internested relationship during said molding of said concavo-convex articles.

References Cited

UNITED STATES PATENTS

| | | | |
|---|---|---|---|
| 980,144 | 12/1910 | Crowley | 25—99 |
| 1,305,474 | 6/1919 | Lewis | 18—6 |
| 1,469,820 | 9/1923 | Ruby | 25—99 |
| 1,905,663 | 4/1933 | Wallace | 18—6 |
| 2,350,996 | 6/1944 | Atkinson et al. | 18—19 X |
| 2,764,193 | 9/1956 | Knowles. | |
| 2,866,230 | 12/1958 | Holte | 18—4 X |
| 3,099,043 | 7/1963 | Held | 18—4 X |
| 3,280,430 | 10/1966 | Antrobus | 18—14 |
| 3,298,064 | 1/1967 | Taga | 18—4 X |

FOREIGN PATENTS 61,855   12/1954   France.

WILLIAM J. STEPHENSON, *Primary Examiner.*